US009607611B2

United States Patent
Dayan et al.

(10) Patent No.: US 9,607,611 B2
(45) Date of Patent: Mar. 28, 2017

(54) METHOD FOR AUTOMATICALLY TRANSFORMING TEXT INTO VIDEO

(71) Applicant: Wibbitz Ltd., Tel Aviv (IL)

(72) Inventors: Zohar Dayan, Mazor (IL); Yotam Cohen, Har Adar (IL)

(73) Assignee: Wibbitz Ltd., Tel Aviv (IL)

( * ) Notice: Subject to any disclaimer, the term of this patent is extended or adjusted under 35 U.S.C. 154(b) by 0 days.

(21) Appl. No.: 14/650,850

(22) PCT Filed: Dec. 5, 2013

(86) PCT No.: PCT/IL2013/051003
§ 371 (c)(1),
(2) Date: Jun. 9, 2015

(87) PCT Pub. No.: WO2014/091479
PCT Pub. Date: Jun. 19, 2014

(65) Prior Publication Data
US 2015/0332666 A1    Nov. 19, 2015

Related U.S. Application Data

(60) Provisional application No. 61/735,112, filed on Dec. 10, 2012.

(51) Int. Cl.
*H04N 9/80* (2006.01)
*G10L 13/04* (2013.01)
(Continued)

(52) U.S. Cl.
CPC ............ *G10L 13/043* (2013.01); *G06F 17/21* (2013.01); *G06F 17/28* (2013.01);
(Continued)

(58) Field of Classification Search
CPC .................................. G06F 17/21; G06F 17/28
(Continued)

(56) References Cited

U.S. PATENT DOCUMENTS

| 6,374,209 B1 | 4/2002 | Yoshimi et al. |
| 2003/0229854 A1 | 12/2003 | Lemay |

(Continued)

FOREIGN PATENT DOCUMENTS

WO    WO 2012/154618 A2    11/2012

OTHER PUBLICATIONS

Patent Cooperation Treaty, International Search Report, International Patent Application No. PCT/US2013/051003, Mar. 19, 2014, 5 Pages.

(Continued)

*Primary Examiner* — Thai Tran
*Assistant Examiner* — Mishawn Hunter
(74) *Attorney, Agent, or Firm* — Fenwick & West LLP

(57) ABSTRACT

According to the present invention there is provided a method for automatically converting text-based information and content to video form. In one embodiment of the invention the method creates a video which preserves the main idea of a given input text, and is adapted to convey the essence of the text. According to the invention data is extracted from the input text and from other sources of information relevant to it, so that the text can be analyzed as a whole and with respect to its main content. After extracting all the possible data, the text is semantically analyzed, summarized and converted to a video as a configuration file.

12 Claims, 22 Drawing Sheets

(51) Int. Cl.

| | |
|---|---|
| *G11B 27/031* | (2006.01) |
| *G10L 13/027* | (2013.01) |
| *H04N 21/81* | (2011.01) |
| *H04N 21/8543* | (2011.01) |
| *G06F 17/21* | (2006.01) |
| *G06F 17/28* | (2006.01) |
| *G06F 17/30* | (2006.01) |

(52) U.S. Cl.
CPC .. *G06F 17/30719* (2013.01); *G06F 17/30781* (2013.01); *G10L 13/027* (2013.01); *G11B 27/031* (2013.01); *H04N 21/812* (2013.01); *H04N 21/8543* (2013.01)

(58) Field of Classification Search
USPC ................ 715/234; 704/200, 235, 257, 260; 348/441; 386/239–241
See application file for complete search history.

(56) References Cited

U.S. PATENT DOCUMENTS

| | | |
|---|---|---|
| 2006/0197764 A1 | 9/2006 | Yang |
| 2009/0150364 A1 | 6/2009 | Melander et al. |
| 2009/0222395 A1 | 9/2009 | Light et al. |
| 2010/0238180 A1 | 9/2010 | Kang et al. |
| 2012/0150852 A1 | 6/2012 | Sheedy et al. |
| 2012/0177345 A1 | 7/2012 | Trainer et al. |
| 2013/0294746 A1* | 11/2013 | Oz .......................... H04N 9/87 386/241 |
| 2014/0025366 A1* | 1/2014 | Georgiev .............. G06F 17/289 704/2 |
| 2015/0011311 A1* | 1/2015 | Relan ...................... A63F 13/30 463/31 |
| 2015/0161565 A1* | 6/2015 | Kraft ..................... G06Q 10/00 348/441 |

OTHER PUBLICATIONS

Patent Cooperation Treaty, Written Opinion of the International Searching Authority, International Patent Application No. PCT/US2013/051003, Mar. 19, 2014, 5 Pages.

Raghu, "Wibbitz: Convert Your Text Contents Into Highly Interactive Video Instantly [Video]" Retrieved from the internet: URL <http://web.archive.org/web/20121008051504/http://www.dazeinfo.com/2012/0 6/06/wibbitz-convert-text-contents-into-video/> Jun. 6, 2012, 4 Pages.

Wibbitz, "Wibbitz provides a text-to-vodeo technology that can automatically turn any text-based article, post or feed on the web into a video," May be viewed on Youtube [online], Retrieved from the internet: URL <http://www.youtube.com/watch?v=4HkfJwq0ul> Jun. 25, 2012.

European Extended Search Report, European Application No. 13862585.0, May 23, 2016, 14 pages.

Anonymous: "HK Billionaire Invests $2.3M in Test-To-Video Startup Wibbitz," Oct. 20, 2012, 6 pages, [Online] [Retrieved on May 6, 2016] Retrieved from the Internet<URL:http://web.archive.org/web/20120610182406/http://nocamels.com/2012/06/hk-billionaire-invests-2-3m-in-text-to-video-startup-wibbitz>.

* cited by examiner

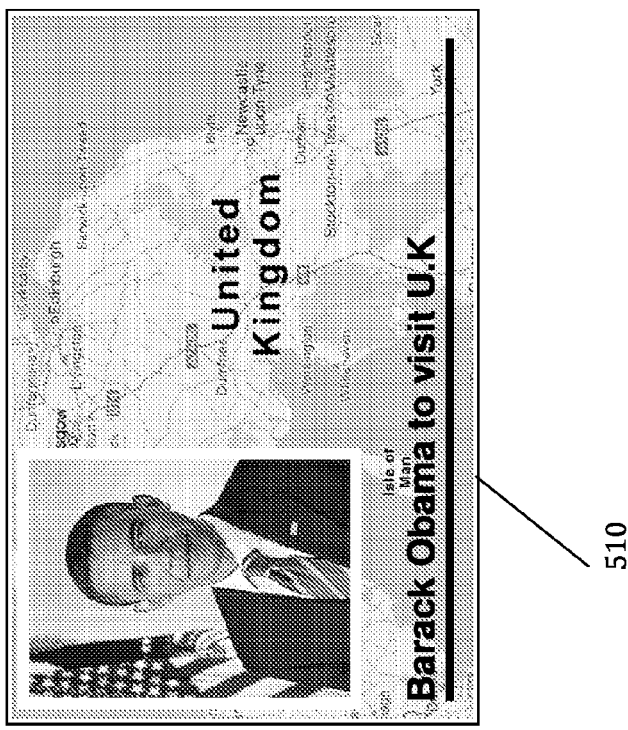
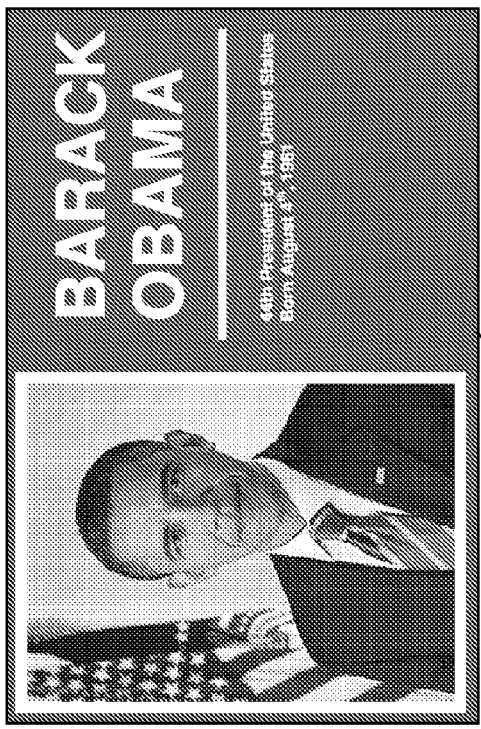
Fig. 5

```
{
    "nlpElements": [{
        "properties": {
            "id": "wbtz_1",
            "priority": 0.85675,
            "originalTextOffset": 1102,
            "text": "Ronaldo",
            "type": "person",
            "name": "Ronaldo"
        }
    }, {
        "properties": {
            "id": "wbtz_948",
            "text": "the Spanish champions",
            "type": "phrase",
            "originalTextOffset": 1031
        }
    }, {
        "properties": {
            "id": "wbtz_950",
            "text": "the league title",
            "type": "phrase",
            "originalTextOffset": 1184
        }
    }, {
        "properties": {
            "id": "wbtz_11",
            "priority": 0.240857,
            "originalTextOffset": 159,
            "text": "CNN",
            "type": "company",
            "name": "CNN"
        }
    }, {
        "properties": {
            "id": "wbtz_13",
            "priority": 0.215938,
            "originalTextOffset": 173,
            "text": "Madrid",
            "type": "city",
            "name": "Madrid"
        }
    }, {
        "properties": {
            "id": "wbtz_14",
            "priority": 0.203958,
            "originalTextOffset": 1285,
            "text": "Portugal",
            "type": "state",
            "name": "Portugal"
        }
```

Fig. 8

```
}, {
    "properties": {
        "id": "wbtz_16",
        "priority": 0.197668,
        "originalTextOffset": 1151,
        "text": "Manchester United",
        "type": "organization",
        "name": "Manchester United F.C."
    }
}, {
    "properties": {
        "id": "wbtz_933",
        "referent": "times",
        "originalTextOffset": 998,
        "text": "164 times",
        "numPart": 164.0,
        "type": "number"
    }
}
```

Fig. 8 (Continued)

Clip script:

```
{
    "data": {
        "media": {
            "m0": {
                "type": "image",
                "data": {
                    "src": "http://wbtz-media-dev.s3.amazonaws.com/page/images/6c4d22d0-286a-44b9-980a-508385045de7.jpg"
                },
                "format": "jpg"
            },
            "m1": {
                "type": "image",
                "data": {
                    "src": "http://wbtz-media-dev.s3.amazonaws.com/page/images/94617ea0-42f1-4fc7-b846-41ca3394fee5.jpg"
                },
                "format": "jpg"
            },
            "m2": {
                "type": "image",
                "data":

{
                    "src": "http://wbtz-media-dev.s3.amazonaws.com/page/images/16dadc28-8a0a-417b-bfe3-2fe76f6a4389.jpg"
                },
                "format": "jpg"
            },
            "m3":

{
                    "type": "image",
                    "data": {
                        "src": "http://wbtz-media-dev.s3.amazonaws.com/page/images/bab598d6-c4e0-4391-a048-d4d7638bff31.jpg"
                    },
                    "format": "jpg"

},
            "m4": {
                "type": "image",
                "data": {
                    "src": "http://wbtz-media-dev.s3.amazonaws.com/page/images/6474d91d-1887-42b7-b6da-ead38d38bd45.jpg"
                },
                "format": "jpg"
            },
```

Fig. 10

```
            "m5": {
                "type": "image",
                "data":
                {
                    "src": "http://wbtz-media-
dev.s3.amazonaws.com/page/images/57b8cb10-f150-42aa-92d2-
27fb5504b863.jpg"
                },
                "format": "jpg"
            },
            "m6":
            {
                "type": "image",
                "data": {
                    "src": "http://wbtz-media-
dev.s3.amazonaws.com/page/images/f22f2ba9-fae0-4713-90bb-
09a5fdeba9cc.jpg"
                },
                "format": "jpg"
            },
            "m7": {
                "type": "image",
                "data": {
                    "src": "http://wbtz-media-
dev.s3.amazonaws.com/page/images/fac114f3-d800-43e6-b354-
593c0c58cb9a.jpg"
                },
                "format": "jpg"
            },
            "m8": {
                "type": "image",
                "data":
                {
                    "src": "http://wbtz-media-
dev.s3.amazonaws.com/page/images/dc8d3ce0-2c17-4002-b59c-
4a5791963931.jpg"
                },
                "format": "jpg"
            },
            "m9":

{
                "type": "image",
                "data": {
                    "src": "http://wbtz-media-
dev.s3.amazonaws.com/page/images/ebc80302-97de-4922-b910-
4a55cfa111b1.jpg"
                },
                "format": "jpg"

},
            "m10": {
                "type": "image",
                "data": {
                    "src": "http://wbtz-media-
dev.s3.amazonaws.com/page/images/1ae9830e-ec16-4963-a2db-
5d35a2104200.jpg"
                },
                "format": "jpg"
```

Fig. 10 (Continued)

```
            },
            "m11": {
                "type": "audio",
                "data":
                {
                    "src": "http://wbtz-media-
dev.s3.amazonaws.com/page/audio/a501feea-97c6-433d-a1a2-
6efad68b8c41.mp3"
                },
                "format": null
            }
        },
        "directives": {
            "d0": {
                "type": "playAudio",
                "data": {
                    "loop": "false"
                },
                "media": ["m11"],
                "events":

[]
            },
            "d1": {
                "type": "person",
                "data": {
                    "pictures": ["m0"],
                    "name": "Cristiano Ronaldo",
                    "title": "Soccer Player",
                    "nationality": "Portugal",
                    "start": "0",
                    "duration": "5065"
                },
                "media": ["m0"],
                "events": []
            },
            "d2": {
                "type": "event",
                "data":
                {
                    "pictures": ["m1"],
                    "name": "football",
                    "title": "Sport",
                    "start": "5065",
                    "duration": "2536"
                },
                "media": ["m1"],
                "events": []

},
            "d3":

{
                "type": "company",
                "data": {
                    "pictures": ["m2"],
                    "name": "CNN",
                    "ticker": null,
                    "symbol": "m3",
```

Fig. 10 (Continued)

```
            "start": "7601",
            "duration": "4169"
        },
        "media":

["m2", "m3"],
        "events": []
    },
    "d4": {
        "type": "person",
        "data": {
            "pictures": ["m4"],
            "name": "Cristiano Ronaldo",
            "title": "Soccer Player",
            "nationality": "Portugal",
            "start": "11770",
            "duration": "4324"
        },
        "media": ["m4"],
        "events": []
    },
    "d5": {
        "type": "person",
        "data":

{
            "pictures": ["m5"],
            "name": "Lionel Messi",
            "title": "Soccer Player",
            "nationality": "Argentina",
            "start": "16094",
            "duration": "2757"
        },
        "media": ["m5"],
        "events": []
    },
    "d6": {
        "type": "text",
        "data":
        {
            "pictures": ["m6"],
            "text": "a new level",
            "start": "18851",
            "duration": "4021"
        },
        "media": ["m6"],
        "events": []

},
    "d7":

{
        "type": "person",
        "data": {
            "pictures": ["m7"],
            "name": "Cristiano Ronaldo",
            "title": "Soccer Player",
            "nationality": "Portugal",
```

Fig. 10 (Continued)

```
                    "start": "22872",
                    "duration": "2011"
            },
            "media": ["m7"],
            "events": []
    },
    "d8": {
        "type": "number",
        "data":
        {
            "text": 164.0,
            "refer": "times",
            "start": "24883",
            "duration": "5254"
        },
        "media": [],
        "events": []
    },
    "d9": {
        "type": "person",
        "data":

{
            "pictures": ["m8"],
            "name": "Lionel Messi",
            "title": "Soccer Player",
            "nationality": "Argentina",
            "start": "30137",
            "duration": "3335"
        },
        "media": ["m8"],
        "events": []
    },
    "d10": {
        "type": "quote",
        "data":

{
            "text": "But if you really know me, if you are my
friend and I leave you inside my house and you share the day with me,
you will know I hate to lose",
            "quotee": {
                "name": "Lionel Messi",
                "pictures": ["m9"]
            },
            "start": "33472",
            "duration": "9240"

},
        "media":
        ["m9"],
        "events": []
    },
    "d11": {
        "type": "person",
        "data": {
            "pictures": ["m10"],
            "name": "Lionel Messi",
            "title": "Soccer Player",
```

Fig. 10 (Continued)

```
                    "nationality": "Argentina",
                    "start": "42712",
                    "duration": "10398"
                },
                "media": ["m10"],
                "events": []
            },
            "d12":

{
                "type": "slide",
                "data": {
                    "direction": "left",
                    "items": ["d1", "d2", "d3", "d4", "d5", "d6",
"d7", "d8", "d9", "d10", "d11"]
                },
                "media":
                [],
                "events": []
            }
        },
        "timeline": "d0",
        "settings": null
    },
    "type": "script",
    "Version": "2.0.0.31591"
}
```

METHOD FOR AUTOMATICALLY TRANSFORMING TEXT INTO VIDEO

FIELD OF THE INVENTION

The invention relates to computer systems. More specifically, the invention related to a method for converting non-video information, such as text or other content, into video.

BACKGROUND OF THE INVENTION

In the last decade the computer science is in continuous development and the use of web applications is becoming more and more popular. As a result, the use of video and animation clips has also become very popular. Since visual features are easier to grasp, many people tend to prefer watching a video or a movie instead of reading text. Furthermore there is a growing popularity of using concise and bite-sized formats for consuming information.

The process of creating video these days, takes a lot of money and time, and involves a user interaction through the process. Several attempts have been made in the past to convert text-based content and information to video, however, usually the attempts resulted in a video that directly describes each sentence in the text, but does not summarize the text and does not convey the main idea of the text and the spirit of the text. Therefore, there is a need for a method which converts a text to video quickly, automatically and in a manner that conveys the main idea of the entire text.

It is therefore a purpose of the present invention to provide an efficient method for automatically converting text-based information to video.

It is another purpose of the present invention to provide a method for automatically creating a video which summarizes the text, preserves the main idea of a given input text, and is adapted to convey the essence of the text as a whole.

Further purposes and advantages of this invention will appear as the description proceeds.

SUMMARY OF THE INVENTION

The invention is directed to method for converting a text to video, comprising the steps of:
a. extracting the content and information from said text and from sources relevant to said text;
b. analyzing the text and said sources relevant to said text;
c. summarizing the text;
d. defining movie characteristics based on the extracted information;
e. selecting entities and elements to present in a video;
f. creating a visualization tree to find a desirable way to represent the selected entities and elements;
g. setting audio characteristics; and
h. automatically assembling the video as a configuration file.

In one embodiment of the invention, the information extracted from a text may include: images and video from the source page; meta-data; page-links; tweets; author details; date; comments; CSS; and rating.

In another embodiment of the invention, the analysis of the text and sources information is performed according to the criteria of: content categorization; entities and data elements extraction and mapping; creating relations between entities, for example; defining the general properties of the text; and sentiment analysis of the entire text source and specific entities.

In an embodiment of the invention the movie characteristics are selected from among: speed; tempo; colors and fonts; sentiment; look and feel; and site properties; type of visual representation; and type of video output.

In an embodiment of the invention, selecting entity and element is based on the rules of: rules for different types of content, as decided in the movie characteristics step; priority for entity and elements type; variety of entities and elements types; and timing rules.

In an embodiment of the invention, the setting audio characteristics are according to the content properties determined in the movie characteristic steps and may include: narration; sound effects based on defined characteristics and NLP analysis; and music soundtrack.

In an embodiment of the invention, the configuration file is rendered. In an embodiment of the invention, the video is displayed as a native language without being rendered.

In an embodiment of the invention, the native language is HTML/XML/JSON.

In an embodiment of the invention, the configuration file is created in a server and is played upon a user's request.

In an embodiment of the invention, the video is an advertisement created from text based content and other media resources.

In an embodiment of the invention, a single configuration file is embedded on a text article, page or master page in a website or publication to automatically convert its contents into short videos and embed it on every page of said website or publication.

All the above and other characteristics and advantages of the invention will be further understood through the following illustrative and non-limitative description of embodiments thereof, with reference to the appended drawings. In the drawings the same numerals are sometimes used to indicate the same elements in different drawings.

BRIEF DESCRIPTION OF THE DRAWINGS

FIG. 5 shows examples of the output of the implementation of the visualization tree;

FIG. 8 shows an example for some of the retrieved entities from the text.

FIG. 10 shows an example for a clip script that is generated according to an embodiment of the invention.

DETAILED DESCRIPTION OF EMBODIMENTS OF THE INVENTION

According to the present invention there is provided a method for automatically converting text-based information and content to video form. In one embodiment of the invention the method creates a video which preserves the main idea of a given input text, and is adapted to convey the essence of the text. According to the invention data is extracted from the input text and from other sources of information relevant to it, so that the text can be analyzed as a whole and with respect to its main content. After extracting all the possible data, the text is semantically analyzed, summarized and converted to a video as a configuration file. The method of the present invention can for example create a video from an article, or it can display a recipe as a video; another example is a video advertisement that can be automatically generated from a text based content and other media resources. The file is generated on a server and it is played upon a user's request. In addition, the created configuration file is very easy to load and to deliver and saves time, as the photos and videos that are extracted from the sources of information are mostly downloaded before or during the time when the video is played, except for the first few media resources (e.g., two pictures), which are pre-downloaded.

The present invention matches editorial content as well as animated infographics to visually represent the story in the text or certain data within a text.

In the method of the present invention a single configuration file (script) can be embedded on any text article, page or master page in a website or publication to automatically convert its contents into short videos and embed it on every page. By doing so the entire content of a publication or website can be turned into video summaries at very large scales and very quickly.

Figure 1:
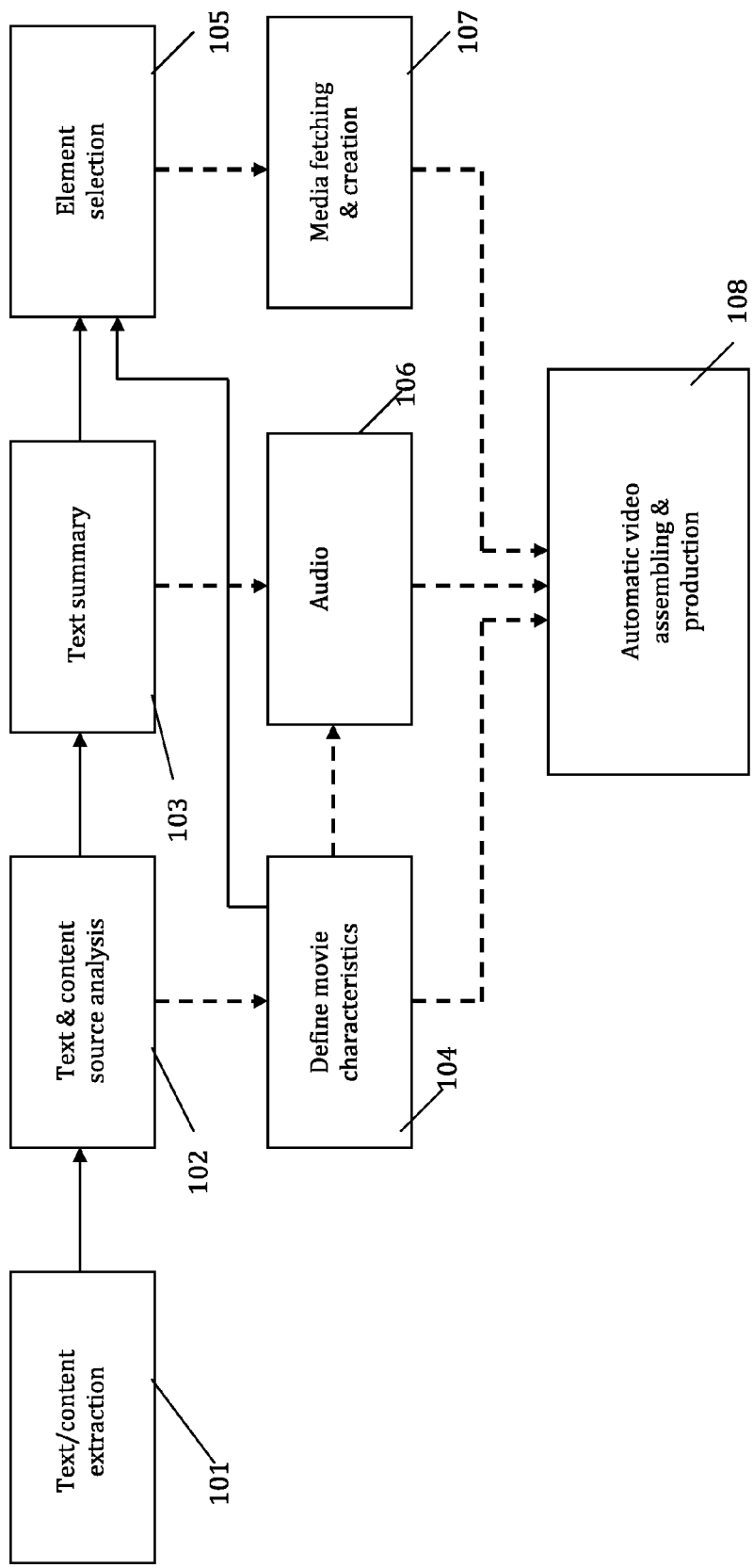
FIG. 1 is a schematic flowchart of an embodiment of the present invention.

Reference is now made to FIG. 1, which shows a schematic flowchart illustrating an embodiment of the present invention. The method illustrated in the figure comprises eight main steps. The first step 101 is the content extraction, wherein a source text is received, and its contents are extracted including the original text, or any other data that may help in the video creation process. For instance: images and video from the source page, meta-data, page-links tweets, author, date, comments, CSS, rating, or any other feature that is useful for the visualization of the text and creating a video.

The second step 102 is the text and content source analysis, in which the text and the other sources of information relevant to the text are analyzed. The analysis is done according to the following criteria:
   a. Content categorization, for example: news, sports, finance, recipes, review, bios, e-commerce, etc. The categorization is done with respect to both the text as a whole unit and to each part and sentence in the text. The categorization is done by understanding the main idea of the text, what is the text talking about in general, what is the essence of the text, in addition to analyzing each sentence in the text; Each source text will get a different treatment depending on the type of content (sports, entertainment, news, etc.)
   b. Entities and data elements extraction and mapping;
   c. Creating relations between entities, for example: person to person, person to place, person to age;
   d. Defining the general properties of the text: main subject, main entity, location, event, etc.;
   e. Sentiment analysis of the entire text source and specific entities.

Each element is presented separately and if it is relevant the relation between the elements is also presented. Once the relations between entities are created it is possible to better visualize the content. For example, in the sentence: "Barack Obama will visit the troops in Iraq next month" there is a Person-Location relation; a person traveling to a place can be visualized graphically in an animation or info-graphic. Another example of a different type of Person-Location relation could be a person that was born at a location. These 2 examples would be displayed differently.

Another example is Person-Person relation, which could be a meeting between two individuals, e.g.—"Hillary Clinton is scheduled to meet with David Cameron". Another example for Person-Person relation is a family relation between two persons; "Charlie Sheen joined his father Martin Sheen to the award ceremony".

The visualization of relations between the types of elements can be automatically created using a visualization tree. When new elements are added to the tree new relation types can be made automatically to existing elements.

Sentiment analysis aims to determine the attitude of a speaker or a writer with respect to some topic or the overall contextual polarity of a document.

Classifying the polarity of a given text at the document, sentence, or feature/aspect level means determining whether the expressed opinion in a document, a sentence or an entity feature/aspect is positive, negative, or neutral. Advanced, "beyond polarity" sentiment classification looks, for instance, at emotional states such as "angry," "sad," and "happy."

For example if the text content is about a war or a conflict, the sentiment would most likely be "negative", "sad" or expressing "fear". Using this data it is possible to visually portray this emotional expression using various templates, fonts sound effects and whatever else that can be used to convey that feel.

The third step 103 is the text summary, in which a summary of the text is prepared. For this step, configurable rules for text summary are determined:
   which summary to create, according to the aim of the video length; and
   what percentage of the original text to keep so that a short form video is created.

Once the abovementioned rules are determined, a smart summary is created according to text analysis, which takes into account the category of the source in order to decide which content to keep after the summary. For example, in a sports category it will be decided to keep the relevant scores, while in a financial data category it will be decided to keep the stock information. The length of the text is also taken into consideration, when creating the summary, for example: if the text source is over X words long, it will be summarized to a Y amount of words, when Y is smaller then X. The exact numbers of X and Y are adaptively determined according to each individual text source.

The fourth step 104 is to define the following movie characteristics according to the extracted information:
   Speed (animations, soundtrack, etc.);
   Tempo;
   Colors and fonts;
   Sentiment;
   Look and feel (Themes and which media templates to use)—News, sports, entertainment, recipes, manuals, education, e-commerce, advertisements etc.;
   Site properties.
   Type of visual representation such as picture, video footage info-graphic etc.;
   Type of video output—as a video configuration file or as a rendered video file.

Each of the characters is adaptively defined according to each individual text source that is received. In the characteristics step many parameters are determined, that will later assist in the movie making process. For example after the content category is determined this data can be used to help during the element selection phase. For instance, if the content category is "Finance" then the element selection component would focus on related elements such as: company names, stocks, currencies, market trends etc. Alternatively, if the content category is "Sports" the element selection component would focus to select elements such as scores, teams, player names, venues etc.

The fifth step 105 is the entity and elements selection, where elements and entities are selected to use in the video based on appropriate rules. In the example to follow the following illustrative set of rules are discussed, it is being understood that additional or alternative rules can be employed and that the invention is in no way limited to any specific rule or set of rules exemplified:

- Rules for different types of content, as decided in the Movie characteristics step. For example, in case of a sports article, the emphasis is on scores, player names and venues, while in case of finance articles the emphasis is on currencies, company names, market indexes etc.
- Priority for entity and elements type—e.g. high priority for things that can be visualized using images, maps and videos and lower priority for things that can only be visualized using info-graphics or animated text. It should be understood that, according to the invention, info-graphics are given higher priority than text.
- Variety of entities and elements types—the priority rules are designed to be dynamic so that a certain level of media type variety is reached. An embodiment of the invention is to create a good mix of images, videos, maps, info-graphics and animated text.
- Timing rules—which take into account the amount of time that each element or entity is displayed. It is necessary to have enough spacing between each element so that every element gets the defined display time. The first and last elements are also taken into account and their timing is adjusted as well.

Figure 6:
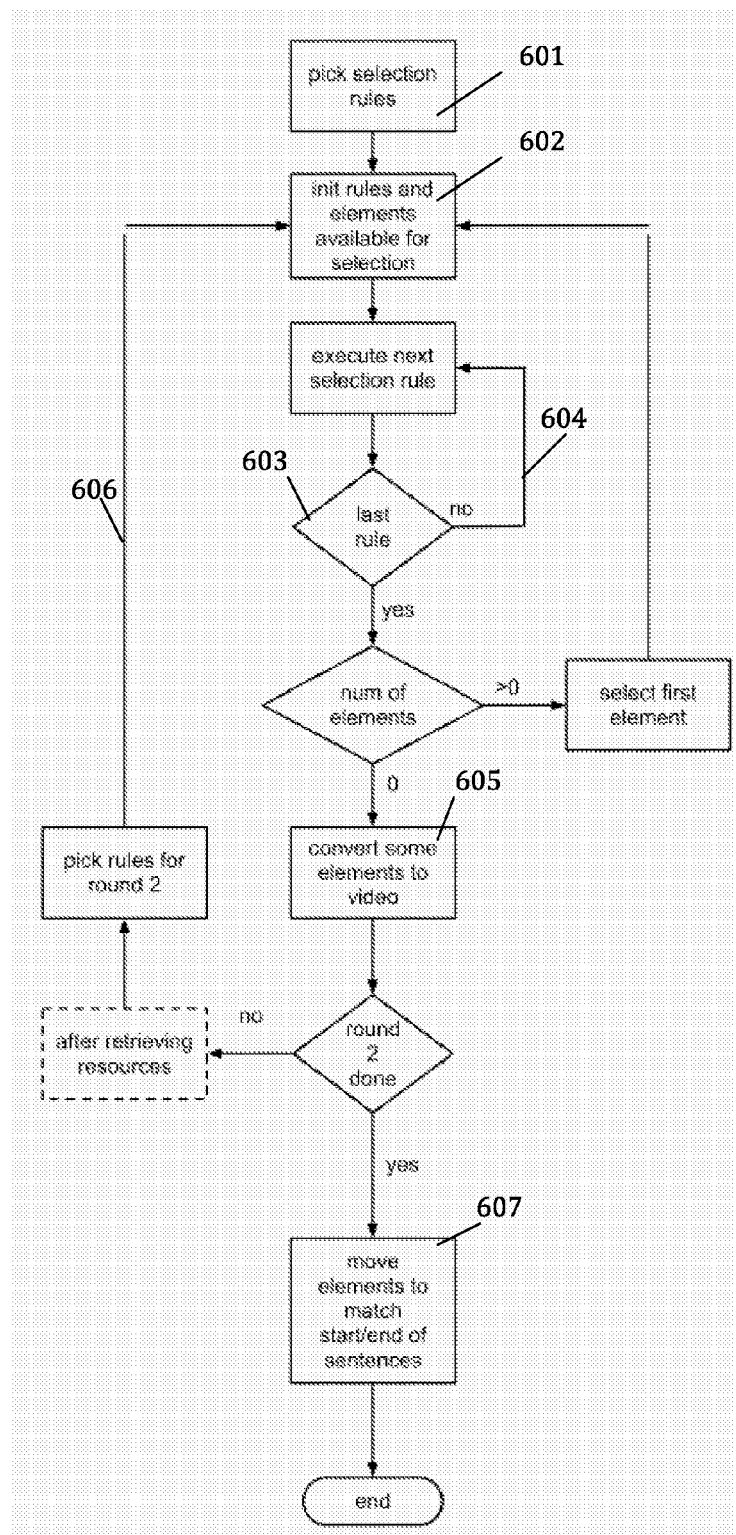
FIG. 6 is a flow chart of an exemplary selection process in which the various steps of the process are detailed.

FIG. 6 is a flow chart of an exemplary selection process in which the various steps of the process are detailed:
a. The first step 601 is to pick the rules for selection. Each rule can either filter the elements or reorder them.
b. In the second step 602, all the chosen rules are run on the available examined elements for selection and thereby filter the elements and reorder them.
c. in the third step 603 it is checked if there is at least one element available after all the rules have been processed, in case the answer is yes, the first element is selected and removed from the examined elements group. In case the answer is no, the fourth step 604 is executed.
d. The fourth step 604, repeats steps (b) and (c), until no more examined elements are left.
e. In the fifth step 605, a few elements are converted to video elements out of the selected group of elements;
f. In the sixth step 606, after resources are retrieved, selection rules are picked for a second round, and steps (b-e) are repeated again.
g. In the seventh step 607, the selected elements position in the text is moved to match the start/end of sentences.

Figure 7:
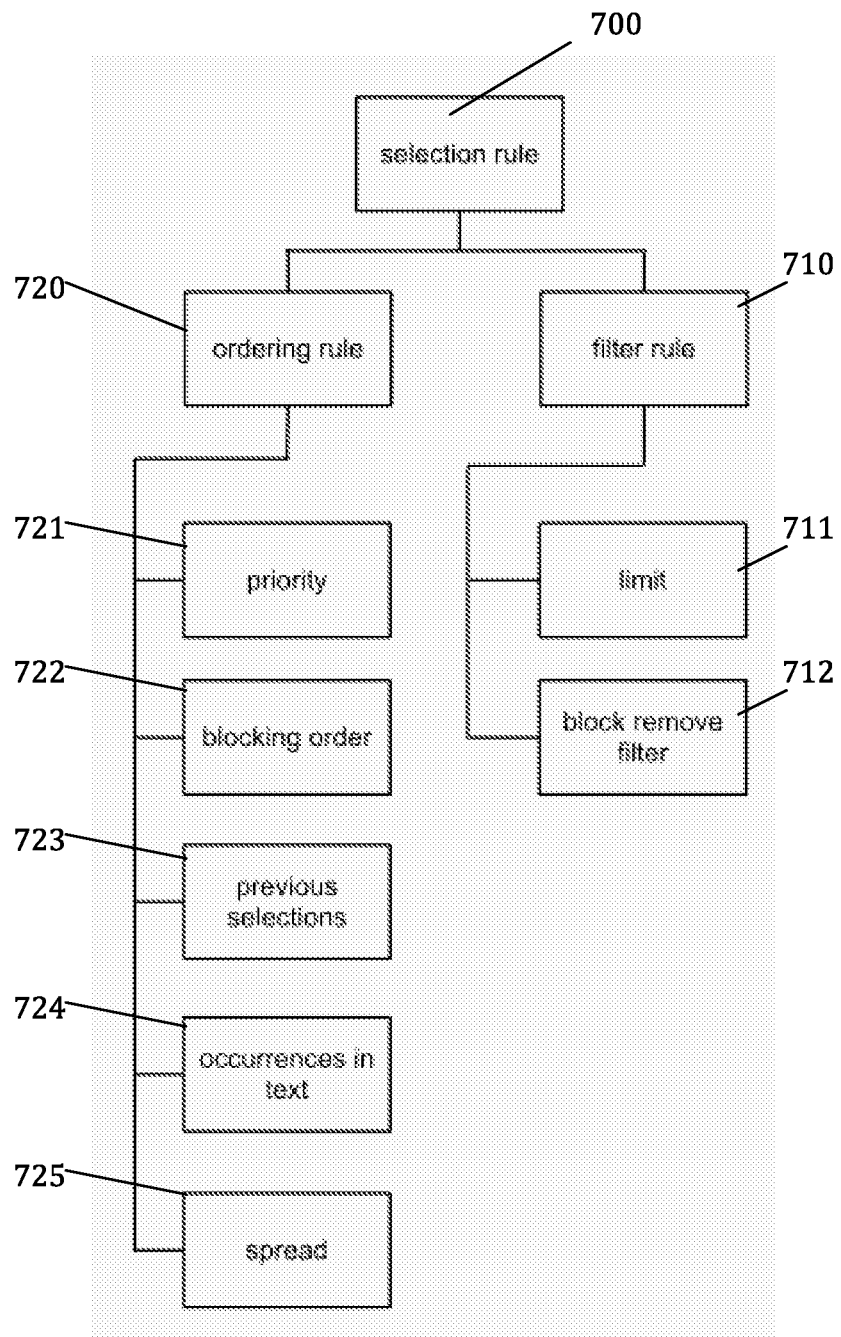
FIG. 7 illustrates the selection rules according to one embodiment of the invention.

FIG. 7 illustrates the selection rules 700 according to one embodiment of the invention. In the figure two sets of rules are shown:
1) filter rules 710, which comprise:
   Limit 711: to check how many instances of the element are already selected against a threshold;
   Block remove filter 712: a series of checks that define if a block element can be selected so that the elements blocking it are removed from selection.
2) Ordering rules 720:
   Priority 721: sort by priority defined by natural language processing elements;
   Blocking order 722: sort by number of already selected elements which block the element, i.e. selected elements that are too close and similar to the element which is being examined can prevent it from being selected;
   Previous selections 723: sort by number of already selected instances of the element;
   Occurrence in text 724: sort by number of occurrences in text of the element;
   Spread 725: sort by distance from other instances of the same element.

The sixth step 106 is the media fetching and creation. After the element selection step, there is the stage of visualization, in which elements or entities chosen in the selection step are taken and used for a "Dynamic visualization tree", which finds the best way to represent a specific entity or element. The visualization tree will be further explained below. After it is decided how to represent each selected element, relevant images are retrieved from a preferred media provider. In some cases an entity may be represented with a general image or video that suits the entity but does not refer specifically to a specific item. Moreover, an image or video that matches the general idea of the text and which are relevant to the entire text and not just to an entity, can be presented.

The seventh step 107 is the Audio setting, which comprises the definitions of:
- Narration—gender, speed, language, artificial voice (TTS), real voice;
- Sound effects based on defined characteristics and NLP analysis;
- Music soundtrack; and
- Every other sound that can help to deliver the story in the best way.

The eighth step 108 is the automatic video assembling. After all the previous steps are completed the video is assembled as a configuration file (e.g. JSON, XML, etc. . . . ). In one embodiment of the invention the configuration file is used without rendering. In this case the video can be displayed as HTML or in other native language on various devices such as: mobile devices, PC, smart TV, smartphone, smart glasses, smart watches etc., without the need to render it into a physical video file.

In another embodiment of the invention the configuration file is rendered. Whether or not to render the configuration file is dictated by convenience of use under specific conditions, it will then be decided whether to render it or not on the basis of practical considerations. This configuration file contains all the media assets and information for the video including direction, display and animation instructions.

Figure 2:
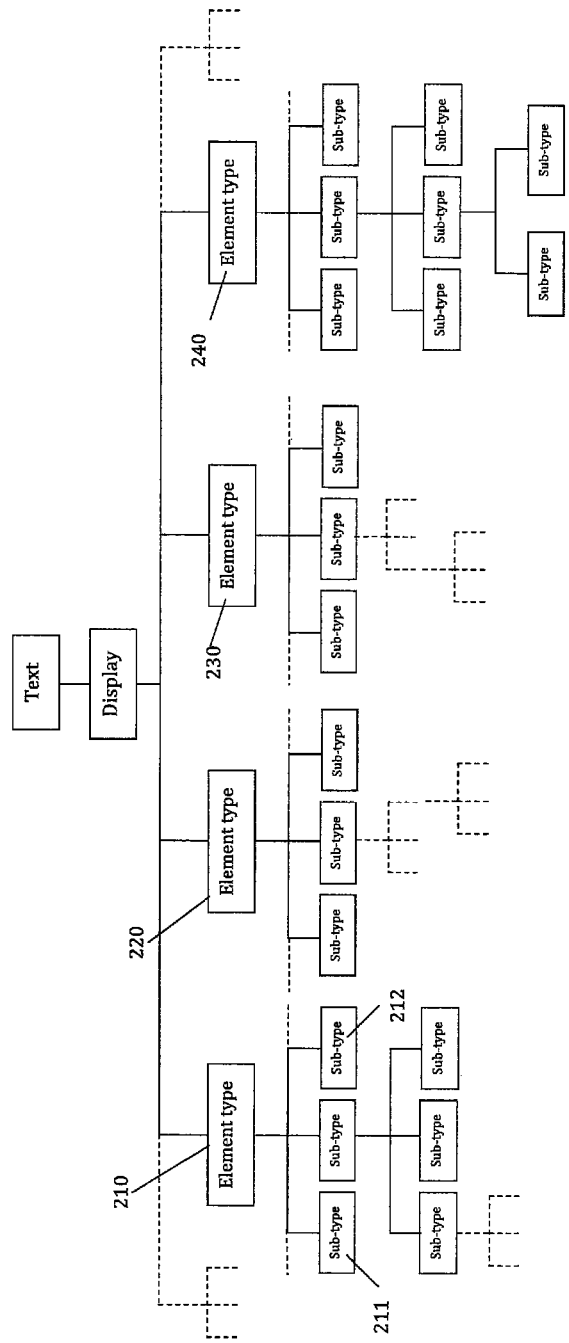
FIG. 2 schematically shows the structure of the visualization tree according to a embodiment of the invention.
Figure 3:
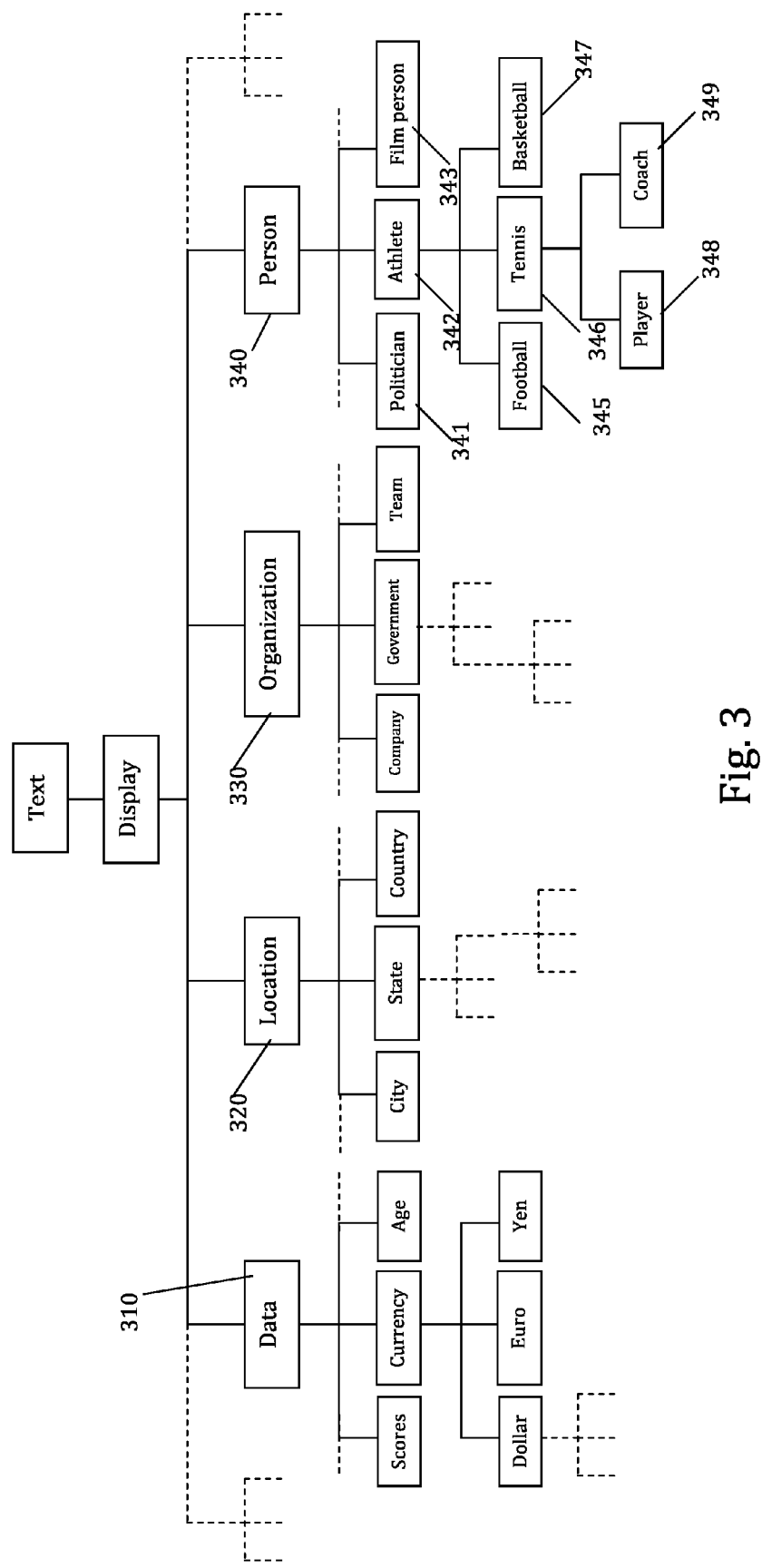
FIG. 3 shows an example for using the visualization tree.

FIG. 2 schematically shows the structure of the visualization tree. The tree is divided into different element types 210, 220, 230 and 240. Each element type is divided into a sub-type such as 211, 212, etc. each sub-type is also divided into a further sub-type if it is possible and so on. Using the tree it can be decided what kind of information should be shown and how it should be placed in the video. In other words, each element and sub-element is automatically visualized differently according to its type and its context within the text source. The tree is also used to decide how and where to search for media for certain types of elements. An example of using the visualization tree can be seen in FIG. 3, in which the tree is divided into the main element types extracted from the text: data 310, location 320, organization 330, and persons 340. The person element type 340 is divided according the profession of the person such as: politician 341, athlete 342 and film person 343. If the person is an athlete, the sub-type of athlete is divided into different fields of sport such as: football 345, tennis 346 and basketball 347. If the person is from the field of tennis, the sub-type of tennis is divided into further sub-types of a player 348 and coach 349 and so on. The data element type 310 is divided to the sub-types of: scores 311, currency 312, and age 313. The currency sub-type is divided into the sub-types of: dollar 315, euro 316 and yen 317 and so on. The data element types can be visually represented by automatically creating animated info-graphics depending on the type of data. The animated info-graphics are also created automatically based on the data that is extracted from the text after the text analysis phase. These info-graphics can visualize certain types of data and automatically create visual adaptations for them. Some examples for data types are: Numbers, percentage, stocks, locations, weather, dates, scores etc. . . . By using the visualization tree, the specific categorization of each specific element in the text is known, and also the main idea and essence of the text is known.

It should be understood that according to the invention the visualization tree and hence the categorization of each element can be continuously expanded.

Figure 4:
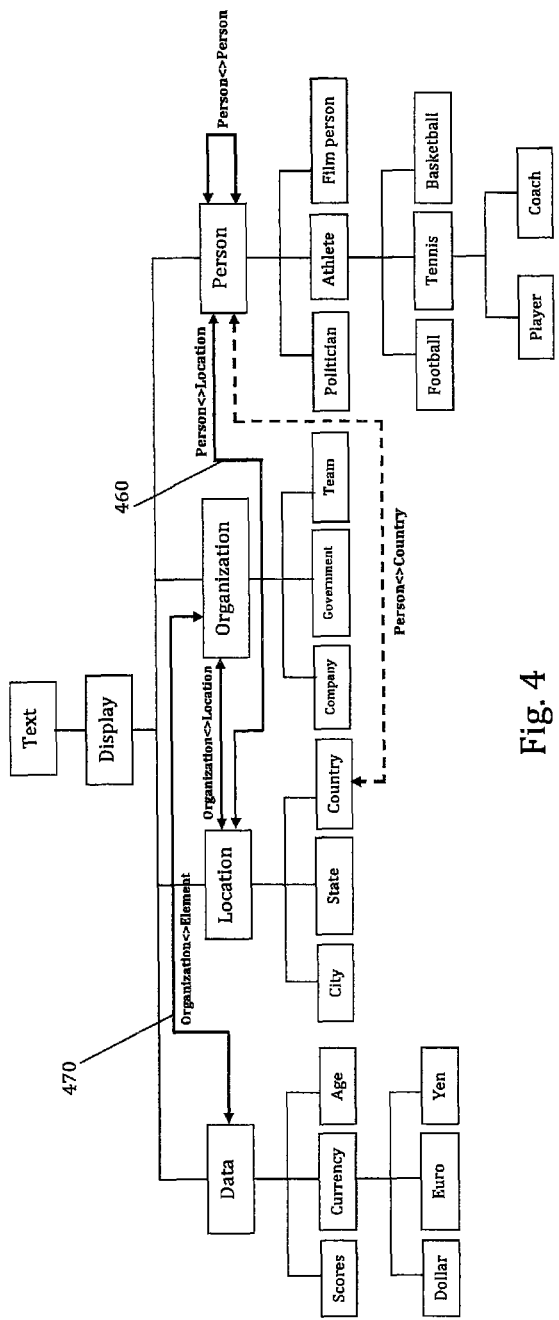
FIG. 4 shows the relationship between different elements in the visualization tree.

FIG. 4 shows the relationship between different elements in the visualization tree such as person-to-location relation 460, and organization to data relation 470. FIG. 5 shows examples of the output of implementation of the visualization tree of FIG. 4. In FIG. 5, element 510 is the output picture for a sentence: "Barack Obama visited the United Kingdom", this example implements the relationship between a person and a country. In case that the text does not contain any relation between the person (in this example: "Barack Obama") and the other elements, the output graphic 520 is displayed.

EXAMPLE

The following is an example showing the whole process of converting text to video. The system entry point is a queue, starting from the movie maker that is initiated with a queue item which contains the text source or a URL containing the text source to be processed.

In this example the text source is extracted from the following URL: http://edition.cnn.com/2012/11/08/sport/football/cristiano-ronaldo-interview/index.html?hpt=ieu t4

1. At first the Web page content is retrieved and "cleaned" from HTML "junk" so that the pure text is received. In this example, it is only the title and body of the article which are extracted as follows:

Extracted Text:
Title:
  Ronaldo admits perceived arrogance has cost him
Body:
  Cristiano Ronaldo believes his "arrogant" image has prevented him from capturing the hearts of football fans across the globe.
  In an exclusive interview with CNN, the Real Madrid forward reveals how his onfield demeanor has left him sitting in the shadow of the sport's golden boy and fans' favorite, Lionel Messi.
  "I don't want to cry about it, but sometimes I think yes," said Ronaldo after being asked whether his image had cost him in the past.
  "It's a question to which I never give the 100% right answer, because sometimes I really don't know.
  "I don't think it's allowed for people to change my personality.
  "Maybe sometimes, I agree that I have a bad image on the pitch because I'm too serious."
  Ronaldo and Messi will go head-to-head for the prestigious Ballon d'Or in January, with the Barcelona star having won the award on each of the previous three occasions.
  Both men have taken the sport to a new level with their record goalscoring feats—Ronaldo has scored an astonishing 164 times in 160 appearances for the Spanish champions, while Messi hit 50 in La Liga alone last term.
  Ronaldo, who won the Ballon d'Or in 2008 when at Manchester United, led Madrid to the league title last season and has scored in his past six successive El Clasicos.
  The 27-year-old Portugal star is unhappy with how he's often portrayed in the media compared to more "loveable" Messi and says he has become a "victim."
  "But if you really know me, if you are my friend and I leave you inside my house and you share the day with me, you will know I hate to lose," he said.
  "I learn by my mistakes and that's life. You know, sometimes I'm a victim of that because they don't know the real Cristiano.
  While Messi often plays with a smile on his face like a kid in the schoolyard, Ronaldo is often seen moaning, gesticulating and scowling while trying to inspire Real to victory.

2. The analysis module analyzes the text, retrieves the language, category and elements as follows:

Document Attributes:
Language: English;
Category: Sports;
Main entity: Cristiano Ronaldo;
Main Location: Madrid;
Main organization: Real-Madrid Football Club;
Date: Nov. 12, 2012.

3. The analysis module also summarizes the text:

Text Summary:
  Cristiano Ronaldo believes his "arrogant" image has prevented him from capturing the hearts of football fans across the globe.
  In an exclusive interview with CNN, the Real Madrid forward reveals how his onfield demeanor has left him sitting in the shadow
  of the sport's golden boy and fans' favorite, Lionel Messi.
  Both men have taken the sport to a new level with their record
  goalscoring feats—Ronaldo has scored an astonishing 164 times in 160 appearances for the Spanish champions, while Messi hit
  50 in La Liga alone last term. "But if you really know me, if you are my friend and I leave you inside my house and you share the day with me, you will know I hate to lose," he said. While Messi often plays with a smile on his face like a kid in the
  schoolyard, Ronaldo is often seen moaning, gesticulating and scowling while trying to inspire Real to victory.

FIG. 8 shows an example of the code for some of the retrieved entities from the text.

4. After the analysis, the selection component selects entities in the summary that will be used in the movie. The following shows the summarized text with all the discovered elements marked in bold after the text analysis phase. The underlined elements are the ones that were selected in the element selection phase to be used in the video:

Cristiano Ronaldo believes his "arrogant" image has prevented him from capturing the hearts of football fans across the globe.

In an exclusive interview with CNN, the Real Madrid forward reveals how his onfield demeanor has left him sitting in the shadow of the sport's golden boy and fans' favorite, Lionel Messi.

Both men have taken the sport to a new level with their record goal scoring feats—Ronaldo has scored an astonishing 164 times in 160 appearances for the Spanish champions, while Messi hit 50 in La Liga alone last term.

"But if you really know me, if you are my friend and I leave you inside my house and you share the day with me, you will know I hate to lose," he said.

While Messi often plays with a smile on his face like a kid in the schoolyard, Ronaldo is often seen moaning, gesticulating and scowling while trying to inspire Real to victory.

At the end of this step there are 11 elements that were selected to be presented in the video.

Figure 9:
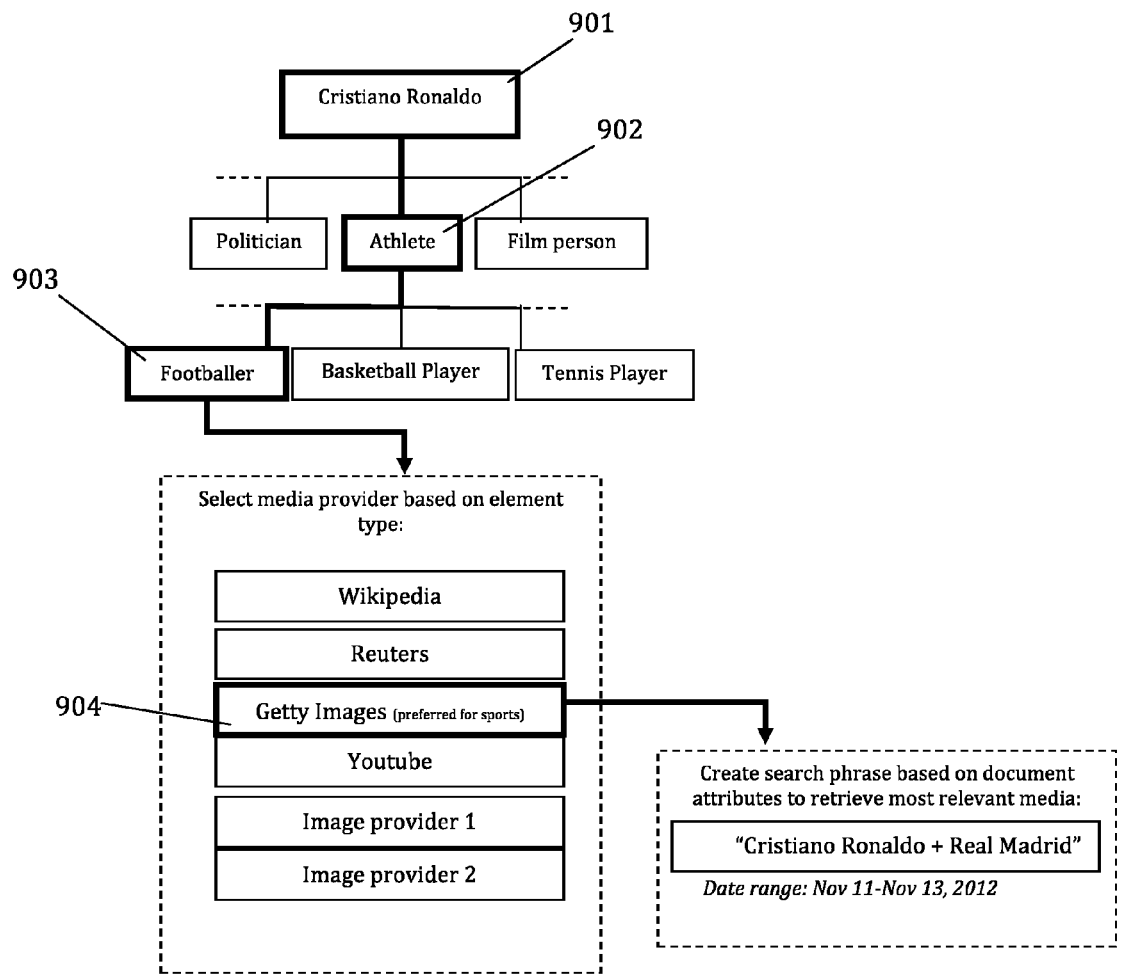
FIG. 9 shows an example for element mapping and image retrieval.

5. According to the selected elements, relevant images are retrieved using a mapping between the element type and a preferred provider. An example for the first element "Cristiano Ronaldo" 901 can be seen in FIG. 9. The element "Cristiano Ronaldo" 901, is related to an athlete 902 which is footballer 903, and therefore, the image for this element is selected from the media provider "Getty Images" 904 which is a media provider preferred for sports.

FIGS. 11A-11K show the final images that were retrieved according to the elements that were selected from the summary to be used in the video. The images are shown in the same order of the selected elements appearance in the summarized text shown above and as it is presented in the create video.

Figure 11A:
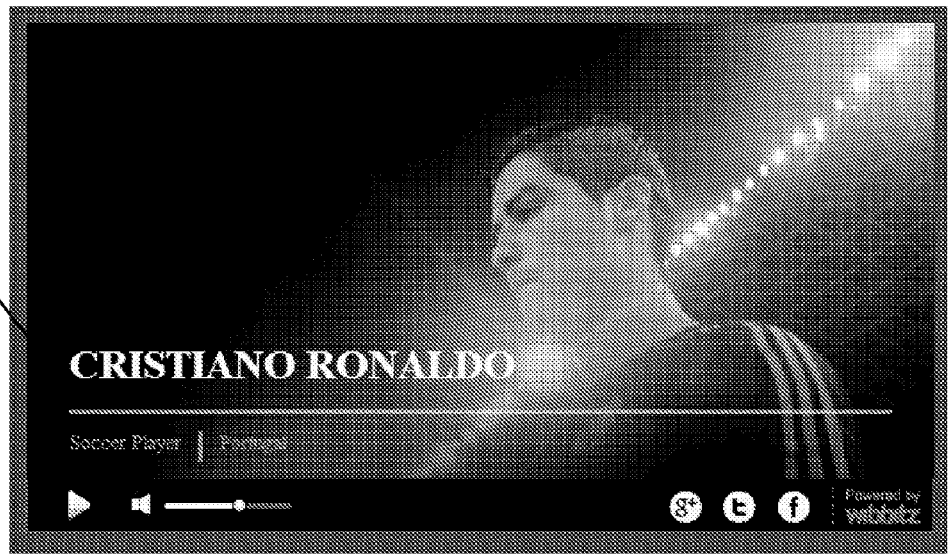
FIGS. 11A-11K show an example for output images that are retrieved and presented according to an embodiment of the invention.
Figure 11B:
Figure 11C:
Figure 11D:
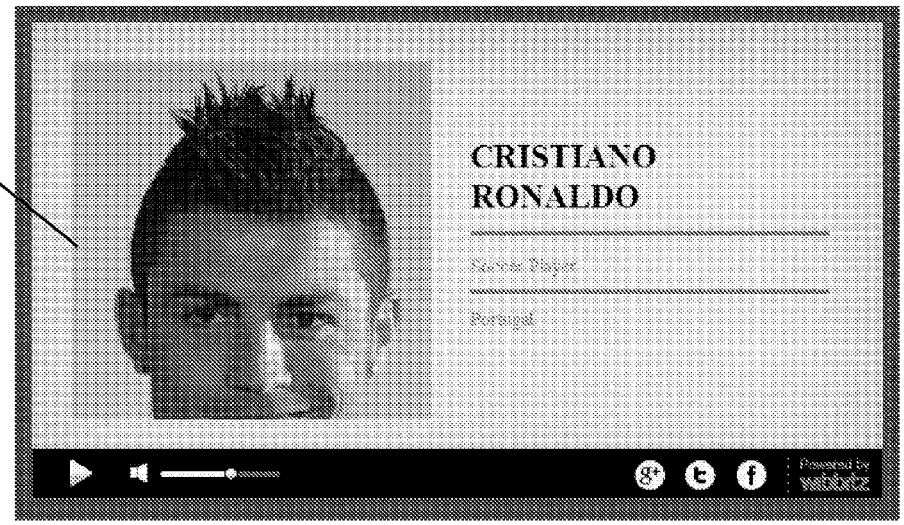
Figure 11E:
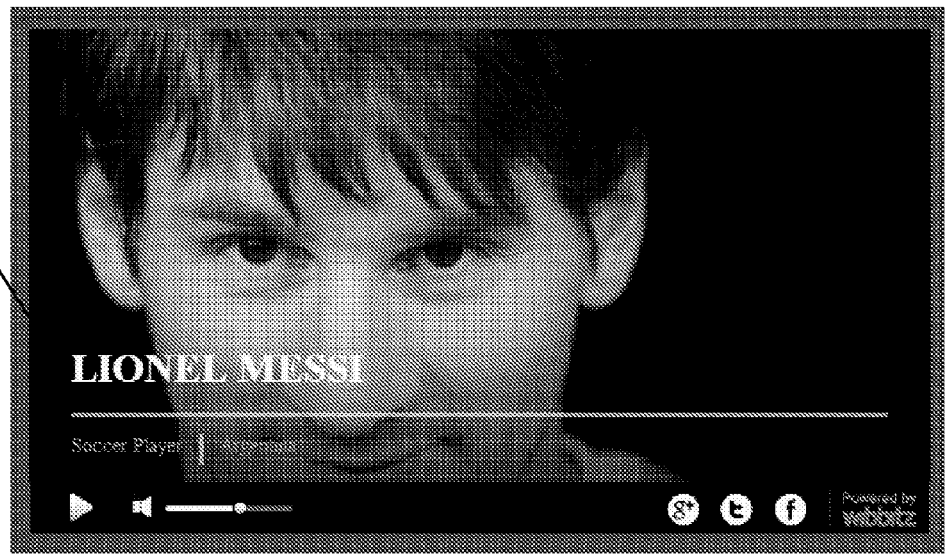
Figure 11F:
Figure 11G:
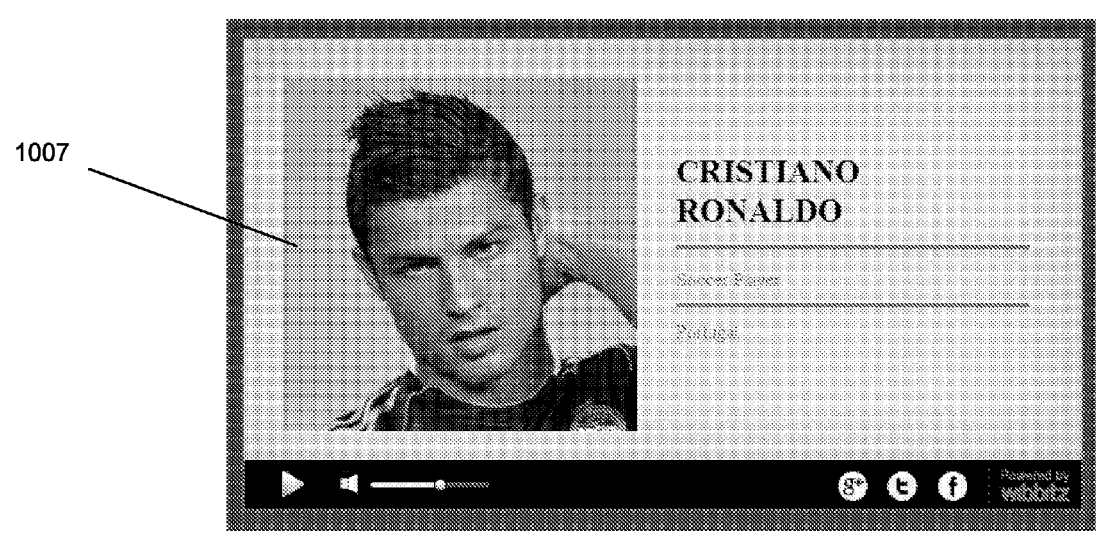
Figure 11H:
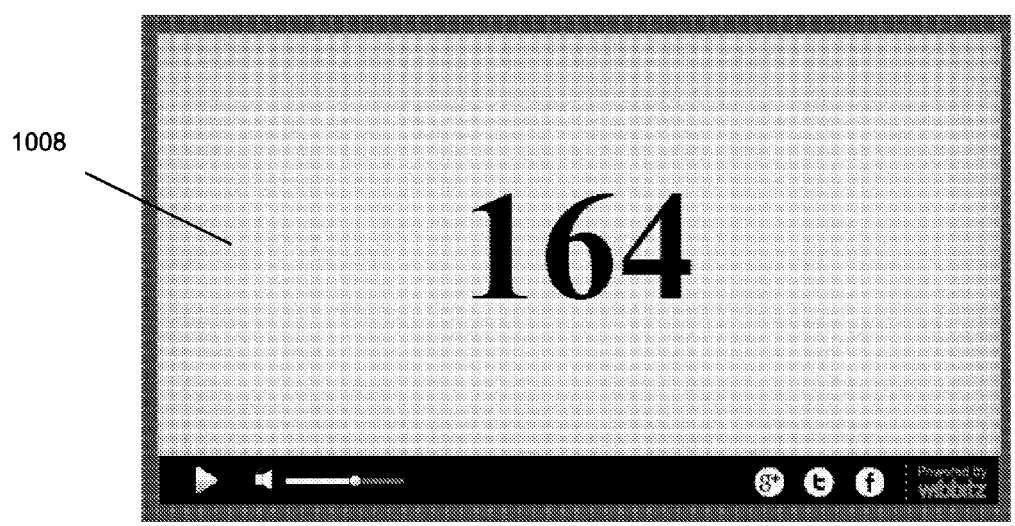
Figure 11I:
Figure 11J:
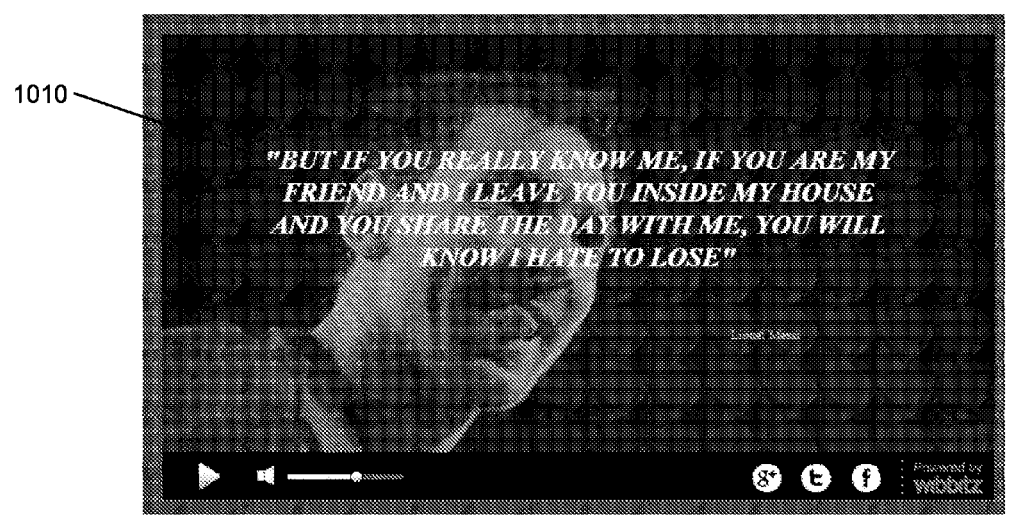
Figure 11K:
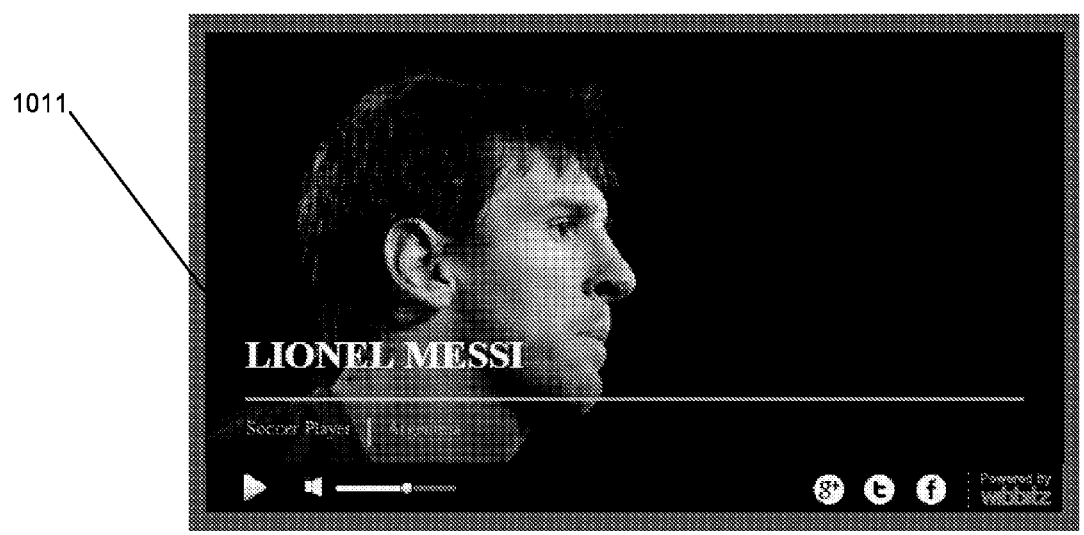

The list of images is as follows:
1. 1001, Cristiano Ronaldo (FIG. 11A);
2. 1002, Football (FIG. 11B);
3. 1003, CNN (FIG. 11C);
4. 1004, His (Cristiano Ronaldo) (FIG. 11D);
5. 1005, fans' favorite, Lionel Messi (FIG. 11E);
6. 1006, Both men have taken the sport to a new level (FIG. 11F);
7. 1007, Ronaldo (FIG. 11G);
8. 1008, 164 times (FIG. 11H);
9. 1009, Messi (FIG. 11I);
10. 1010, "But if you really know me, if you are my friend and I leave you inside my house and you share the day with me, you will know I hate to lose" (FIG. 11J); and
11. 1011, Messi (FIG. 11K).

6. An audio file is created from the summary text with SSML marks for the selected entities marking the exact timing to display the relevant image.

7. The video configuration script is generated from all the above data as can be seen in FIG. 10.

8. The video player interprets the configuration scripts into an audio-visual presentation showing the video created. The video can be watched as HTML, rendered into a video or played on any other player that can interpret the script. The configuration file is generated in the server and is ready to be displayed upon a user's request. Most of the images, photos, pictures and video parts that are acquired from the different media providers are downloaded while playing the video to save time and only the few first media resources are pre-downloaded. In this way the loading of the video is efficient and fast.

Although embodiments of the invention have been described by way of illustration, it will be understood that the invention may be carried out with many variations, modifications, and adaptations, without exceeding the scope of the claims.

The invention claimed is:

1. A method for automatically converting a text to video without user interaction, comprising the steps of:
   a. extracting the content and information from said text and from sources relevant to said text;
   b. analyzing said text and said sources relevant to said text, and generating relations between entities;
   c. automatically summarizing said text;
   d. defining movie characteristics based on said extracted information;
   e. selecting entities and elements to present in a video;
   f. automatically creating a visualization tree, which creates a visualization of the text and which finds a desirable way to represent said selected entities and elements, wherein the creation of animated info-graphics and the decision regarding what information should be shown and how it should be placed in the video automatically uses said tree;
   g. setting audio characteristics; and
   h. automatically assembling said video as a configuration file.

2. A method according to claim 1, wherein the information extracted from a text may include:
   a. images and video from the source page;
   b. meta-data;
   c. page-links;
   d. tweets;
   e. author details;
   f. date;
   g. comments;
   h. CSS; and
   i. rating.

3. A method according to claim 1, wherein the analysis of the text and sources information is performed according to the criteria of:
   a. content categorization;
   b. entities and data elements extraction and mapping;
   c defining the general properties of the text; and
   d sentiment analysis of the entire text source and specific entities.

4. A method according to claim 1, wherein said movie characteristics are selected from among:
   speed;
   tempo;
   colors and fonts;
   sentiment;
   look and feel; and
   site properties;
   type of visual representation;
   type of video output.

5. A method according to claim 1, wherein selecting entity and element is based on the rules of:
   rules for different types of content, as decided in the movie characteristics step;
   priority for entity and elements type;
   variety of entities and elements types; and
   timing rules.

6. A method according to claim 1, wherein the setting audio characteristics are according to the content properties determined in the movie characteristic steps and may include:
  narration;
  sound effects based on defined characteristics and NLP analysis; and
  music soundtrack.

7. A method according to claim 1, wherein the configuration file is rendered.

8. A method according to claim 1, wherein the video is displayed as a native language without being rendered.

9. A method according to claim 8, wherein the native language is HTML or XML or JSON.

10. A method according to claim 1, wherein the configuration file is created in a server and is played upon a user's request.

11. A method according to claim 1, wherein said video is an advertisement created from text based content and other media resources.

12. A method according to claim 1, wherein a single script is embedded on a text article, page or master page in a website or publication to automatically convert its contents into short videos and embed it on any page of said website or publication.

\* \* \* \* \*

UNITED STATES PATENT AND TRADEMARK OFFICE
CERTIFICATE OF CORRECTION

PATENT NO. : 9,607,611 B2
APPLICATION NO. : 14/650850
DATED : March 28, 2017
INVENTOR(S) : Zohar Dayan et al.

It is certified that error appears in the above-identified patent and that said Letters Patent is hereby corrected as shown below:

In the Claims

In Column 10, Line(s) 57-58, Claim 4, "look and feel; and site properties;" to read as --look and feel; site properties;--

In Column 10, Line(s) 59-60, Claim 4, "representation; type of video output." to read as --representation; and type of video output.--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*